United States Patent [19]
Webb

[11] Patent Number: 5,568,631
[45] Date of Patent: Oct. 22, 1996

[54] MULTIPROCESSOR SYSTEM WITH A SHARED CONTROL STORE ACCESSED WITH PREDICTED ADDRESSES

[75] Inventor: Charles F. Webb, Poughkeepsie, N.Y.

[73] Assignee: International Business Machines Corporation, Armonk, N.Y.

[21] Appl. No.: 466,840

[22] Filed: Jun. 6, 1995

Related U.S. Application Data

[63] Continuation of Ser. No. 238,541, May 5, 1994, abandoned.

[51] Int. Cl.$^6$ ........................................... G06F 9/24
[52] U.S. Cl. ..................... 395/375; 364/DIG. 1; 364/DIG. 2; 364/228; 364/228.1; 364/228.3; 364/229; 364/229.1; 364/230; 364/230.1; 364/231.4; 364/238.4; 364/243; 364/243.4; 364/931; 364/931.4; 364/931.46; 364/964; 364/966.1

[58] Field of Search ................. 364/DIG. 1 MS File, 364/DIG. 2 MS File; 395/375, 400.1, 700, 800

[56] References Cited

U.S. PATENT DOCUMENTS 4,171,536 10/1979 Heuer et al. ...................... 364/DIG. 1
4,236,205 11/1980 Kindseth et al. .................. 364/DIG. 1

*Primary Examiner*—Robert B. Harrell
*Attorney, Agent, or Firm*—Lynn L. Augspurger

[57] ABSTRACT

A control store for a microprocessor is divided into two segments with one segment of the control store located on the microprocessor chip and the other segment of the control store located on a separate chip. In multiprocessor applications, a number of the microprocessors share the control store segment on the separate chip. Each control store word includes a field containing a prediction of the address for the next control store word needed by the microprocessor. The predicted address is used to access the control store prior to receipt of the actual request by the processor. When the processor actually requests the next control store word, a compare is performed between the predicted address and the address actually requested by the processor. If they match, the control store word is passed on to the processor. If they do not, the address actually requested by the processor is used to obtain the next control store word. In multiprocessor applications, a number of microprocessors share the same control store segment on the separate chip. As long as the actual address requested by a microprocessor matches the predicted address stored with the previously accessed control store word in the shared segment of the control store, that microprocessor retains access to the shared control store segment. However, on occurrence of a mismatch it loses its priority to access the shared segment and must await the satisfaction of all pending requests of other microprocessors before it can again access the shared segment and obtain the control store word at the actual address requested.

13 Claims, 11 Drawing Sheets

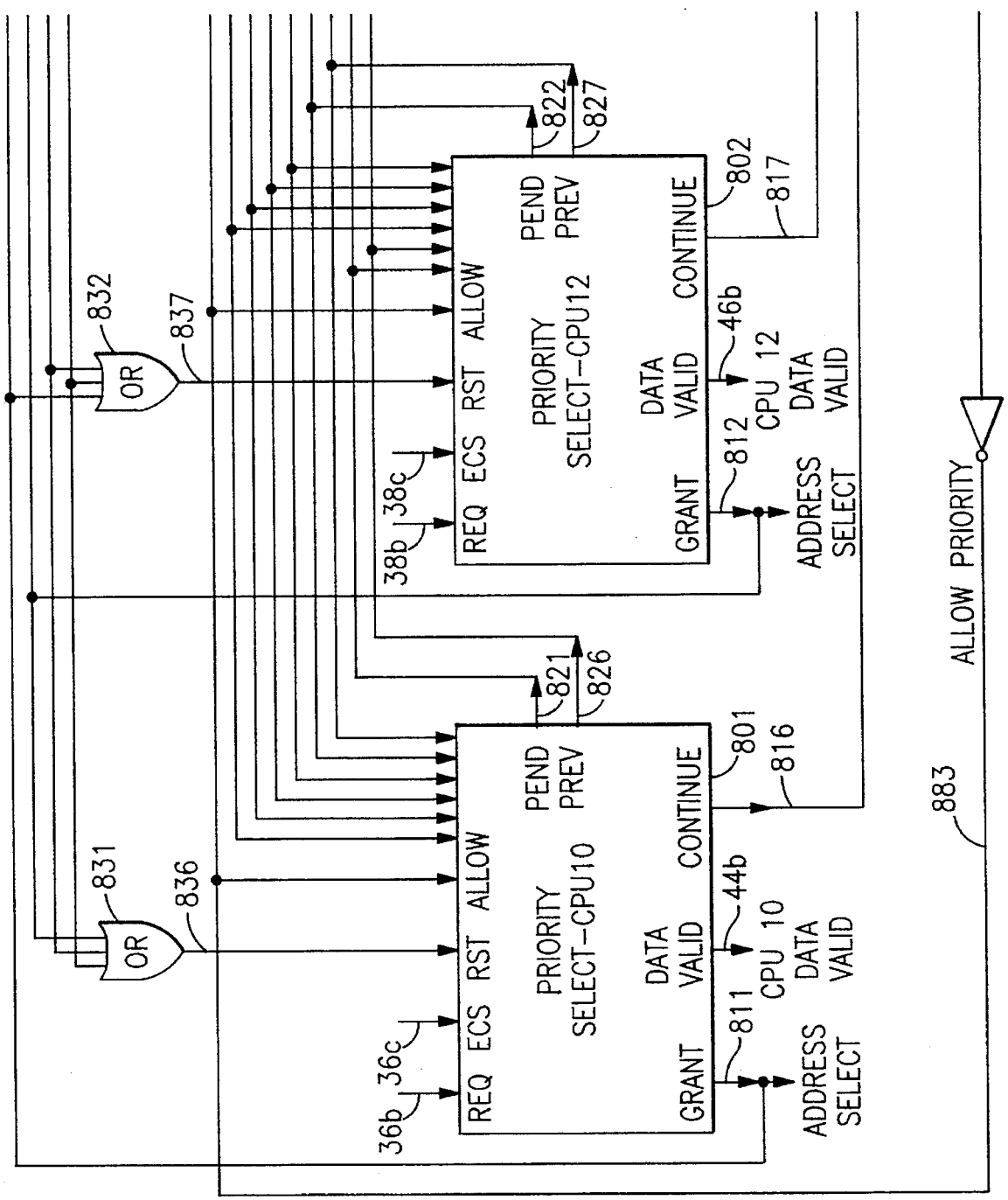

5,568,631

MULTIPROCESSOR SYSTEM WITH A SHARED CONTROL STORE ACCESSED WITH PREDICTED ADDRESSES

This application is a continuation of application Ser. No. 08/238,541 filed May 5, 1994, now abandoned.

BACKGROUND OF THE INVENTION

The present invention relates to control store design and more particularly, to the control design for use with microprocessors in a multiprocessor environment.

One problem in certain central processor designs is the sheer physical size of the control store that is needed to contain the microcode that controls instruction execution for the processor. This problem is acute in microprocessors where the control store is packaged on the same microchip with the processor.

One solution to the problem would be to use a vertical code scheme to code complex operations as a program of simple instructions on chip in the control store which the vertical code instructions are stored off chip in main storage and decoded and executed much like any other instructions. However, to switch in and out of virtual mode requires a large amount of hardware or numerous machine cycles or a combination of both.

Another approach to the problem is to have only a small portion of the microcode in the control store at any one time and to replace blocks of microcode into the control store that have not been recently referenced with new blocks of microcode as they are needed. This approach has at least two significant problems. The first problem is to assure that the next control store word to be executed is in the control store array when it is needed. This is a timing problem which could be substantial depending on the structure of the control store directory. The second problem is to fetch control store data from storage while the memory is in the middle of an operation performing operand fetches and stores. The solution to this second control store problem could add considerable complexity to the storage access controls, especially in a highly-overlapped processor design.

In addition to the sheer size of the control store array, and the corresponding impact on overall chip size, use of a single control store array may restrict the machine cycle time of the microprocessor because of the delays associated with the accessing a large array. It has been suggested that the control store for a microprocessor be segmented with one segment located on the microprocessor chip, and the other segment located off-chip in a separate array. Therefore, partitioning the control store may have significant design advantages even when the chip area is not constrained.

However, segmentation itself introduces substantial delays in the processing of microcode taken from the external array, due to the time required to pass a control store address from the microprocessor chip to the array and to pass the control store data back to the microprocessor chip. If, as is common in the microprocessors to which this invention applies, each microinstruction directly controls the address of the next microinstruction, the execution rate for microcode taken from the separate array would be reduced to one microinstruction every three cycles, versus one microinstruction every cycle when the delays between the microprocessor and the control store array are not present.

SUMMARY OF THE INVENTION

In accordance with the present invention, a segmented control store is used in combination with next address prediction and prefetching to permit faster access to control store microcode located off the microprocessor chip. Each control store word in the control store is provided with a field that contains a prediction of the control store address of the next control store word to be required by the processing unit. When the control store word is read out of the control store the predicted address is compared with the actual address requested by the microprocessor. If they match, the predicted control store word is sent to the processing unit. If they don't match, the address from the processing unit is used to access the correct control store word.

In multiprocessor designs multiple processing units share the off-chip control store, eliminating duplication of a portion of the microcode. In such a multiprocessor application, a mismatch of the predicted address with the actual address requested by a microprocessor causes that microprocessor to lose its priority, to access the shared control store segment, to other microprocessors sharing the control store segment. The microprocessors share access to the shared control store segment on a round robin basis. Therefore, the first mentioned microprocessor must await satisfaction of all pending requests for access by any of the other microprocessors before it can reestablish access to the shared control store segment and obtain the next control store word.

Therefore, it is an object of the present invention to decrease the size of a control store resident on a microprocessor chip.

Another object of the invention is to have a number of microprocessors maintain a portion of their microcode in a control store shared by all the microprocessors.

Another object of the invention is to decrease the effective access time of a control store when the control store is divided; and Still another object of the invention is to provide a priority system for microprocessors accessing a shared control store segment.

These and other objects advantages and novel features of the present invention will become apparent from the following detailed description of the invention when considered in conjunction with the accompanying drawings.

DETAILED DESCRIPTION OF THE PREFERRED EMBODIMENT

Figure 1:
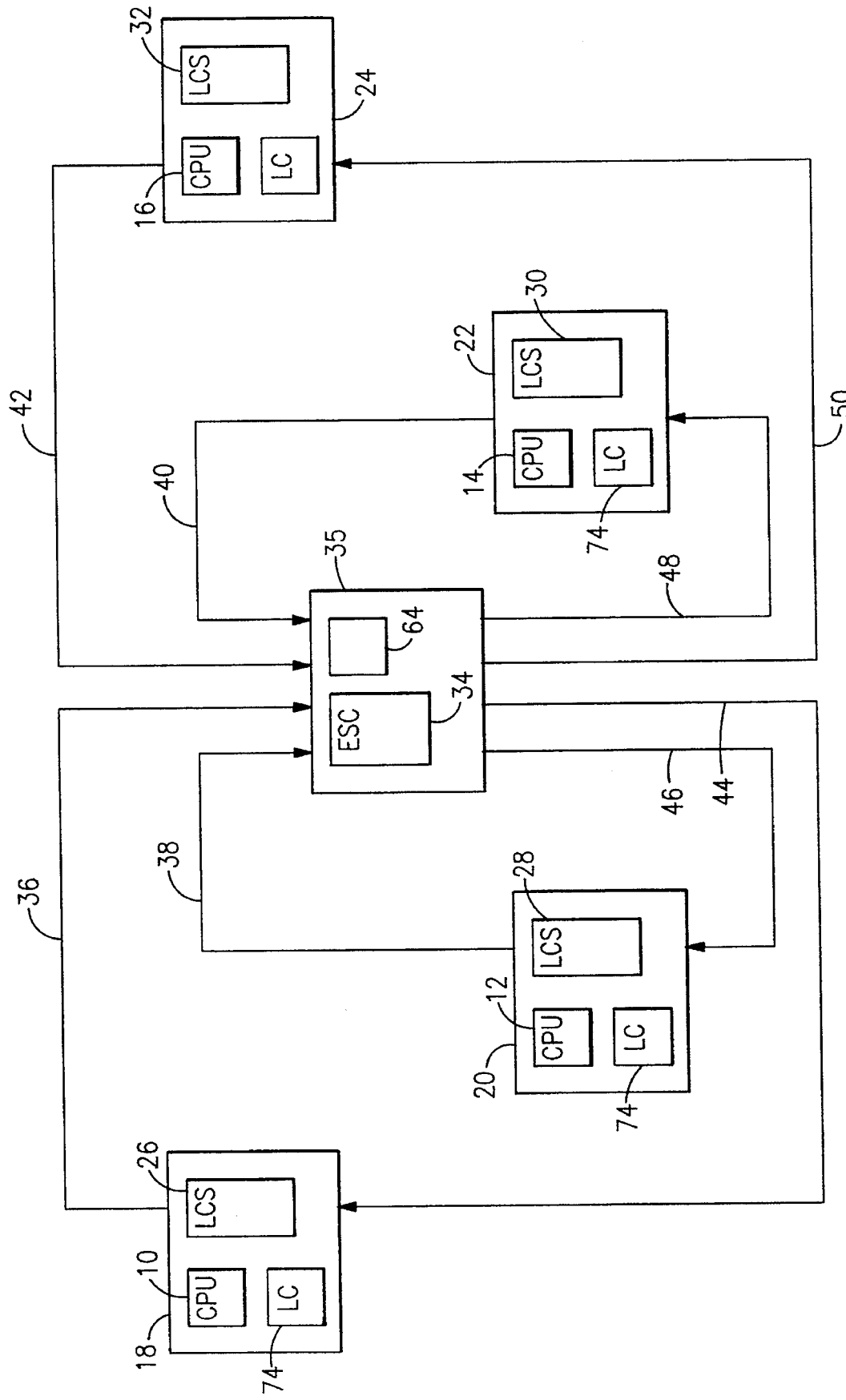
FIG. 1 is a block diagram of a multiprocessor system having multiple microprocessors with microcode in a shared off chip segment of control store.

Referring to FIG. 1, a plurality of processing units 10 to 16 are each located on a separate semiconductor chip 18 to 24 along with one of the local control stores 26 to 32. Each control store 26 to 32 contains a portion of the control store microcode for the processor on its chip. The remainder of the microcode for all processing units 10 to 16 is in a shared extended control store 34 located on a separate semiconductor chip 35.

Connections are provided between the microprocessor chips 18 to 24 and the semiconductor chip 35 containing the shared control store 34 to move control store words out from the extended control store 34 to each of the chips 18 to 24. As shown, the shared control store 34 receives commands from chips 18 to 24 on lines 36 to 42 and provides requested control store words and other responses on lines 44 through 50.

Figure 2:
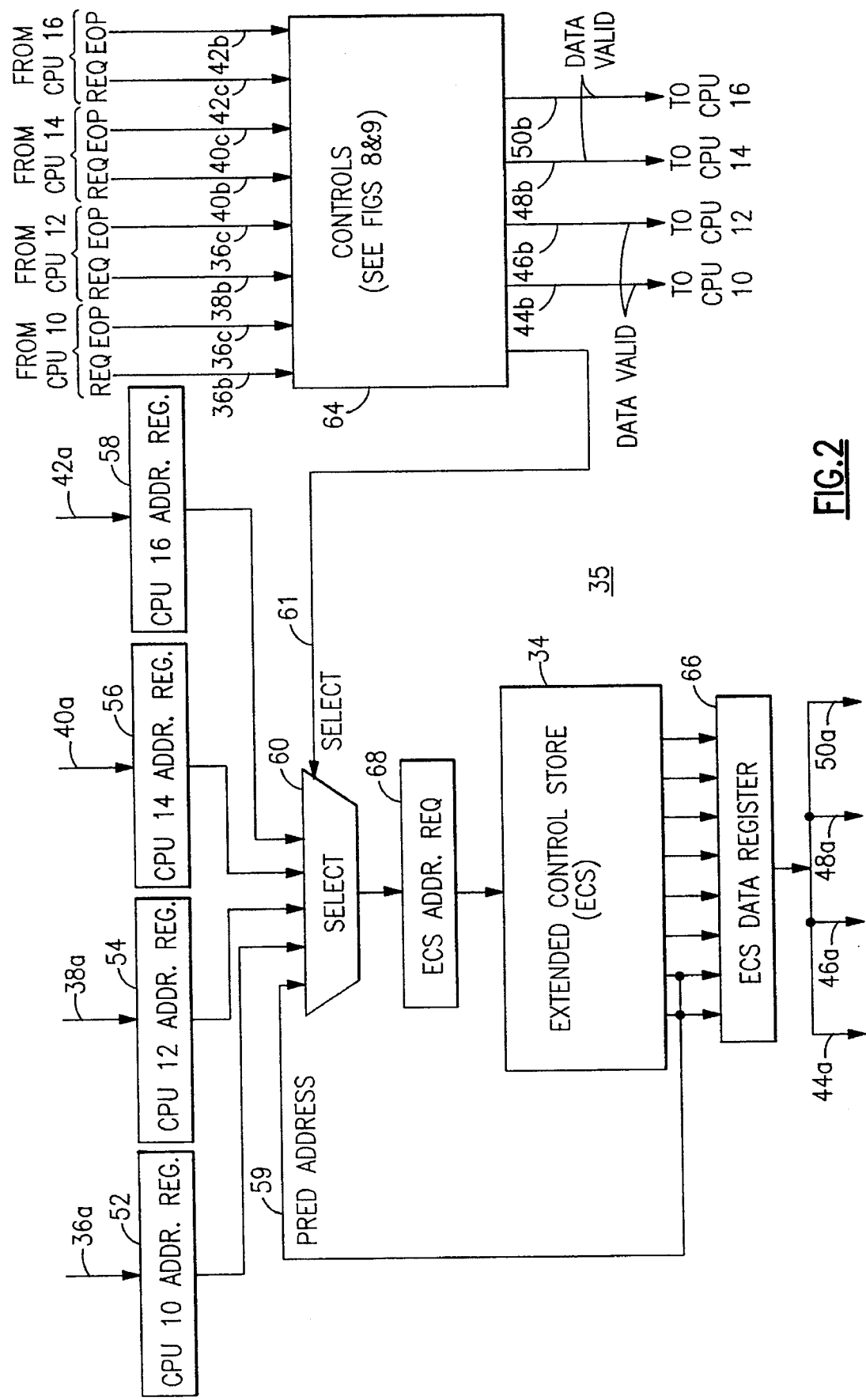
FIG. 2 is a block diagram of the shared segment of the control store shown in FIG. 1.
Figure 4:
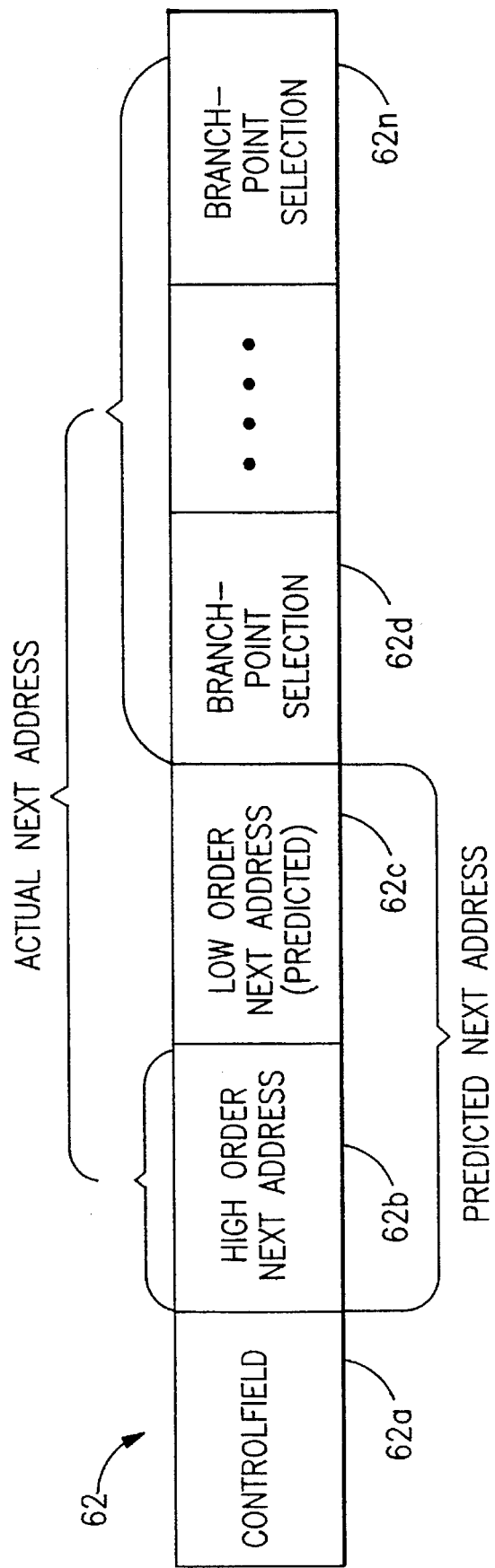
FIG. 4 is a control store word in accordance with the present invention.

Referring now to FIG. 2, the address provided from the various microprocessor chips 18 to 24 on lines 36a to 42a are each entered into an address register 52 through 58 on the shared control store chip 35. The addresses stored in the address registers 52 to 58 are fed into a selection circuit 60 along with the predicted address read out on line 59 during the access of the previous cycle of the extended control store memory array 34. Logic circuitry 64 provides an address select signal on line 61 to the register 60 to select among the outputs of the four address registers 52 through 58 and the predicted address on line 59. The selected address is entered into the address register 68 for the shared control store array Referring now to FIG. 4, each control store word 62 consists of a control field 62a, and fields 62b and 62d to 62n for the actual control store address for the next control store word. The actual control store address fields include a high-order next address field 62b, and one or more branch-point selection fields 62d to 62n of one bit each.

The control store address for the next microinstruction to be executed by the microprocessor is determined by combining the high-order next address field 62b, the branch-point selection fields 62d to 62n, and various control signals from the microprocessor. Each branch-point selection field 62d to 62n is encoded from information provided by the processor to select one of a set of microprocessor control signals ("branch-points"), and the binary value of the selected signal is assigned to one bit of the address for the next microinstruction. The bits thus formed from the branch-points and branch-point selection fields are then appended to the high-order next address field 62b to form the complete control store address of the next microinstruction to be executed. There may be any number of branch-point selection fields 62d to 62n, with larger numbers increasing both the complexity of the design and the flexibility of the microcode. If four branch-point selection fields are used, there are 16 possible next addresses, selected by the various combinations of the 4 specified branch-point conditions. This allows for up to 16-way branching in the microcode.

In accordance with the present invention, a low-order next address prediction field 62c is used to eliminate delay caused by the segmentation of the control store array. This field has the same number of bits as there are in all the branch-point selection fields 62d to 62n, with each bit of the low-order next address field 62c corresponding to one branch-point select field 62d to 62n. The low-order next address field 62c is appended to the high-order next address field 62b to form the predicted address of the next microinstruction to be executed. This next microinstruction can then be read from the control store array while the branch-points selected by the branch-point selection fields 62d to 62n are selected. If the selected branch-points match the values predicted by the low-order next-address field 62c, the correct next microinstruction has been read and is ready for execution. If they do not match, the microinstruction read in response to the predicted next address must be discarded and the correct next microinstruction read from the control store array using the result of the branch-point evaluation.

Since formation of the predicted control store address for the next microinstruction is a simple concatenation of bits, it does not require any inputs from the microprocessor and is done on the extended control store array chip.

The control field 62a in each control store word 62 contains controls for various portions of the microprocessor execution logic. The structure and function of these controls, which vary widely with microprocessor design, are not significant to this invention and are well known to those skilled in the art.

Referring again to FIG. 2, the predicted address is sent on the lines 44a to 50a along with the control store word to all of the chips 18 through 24 containing processors 10 through 18 accessing the shared control store 34. A data valid signal is provided to that processor which currently has priority for use of extended control store on the appropriate one of the lines 44b to 50b. The selection circuit 64 and its operation to select between the predicted address and the addresses contained in registers 52 to 58 will be discussed in more detail in connection with FIGS. 8 and 9.

Figure 3:
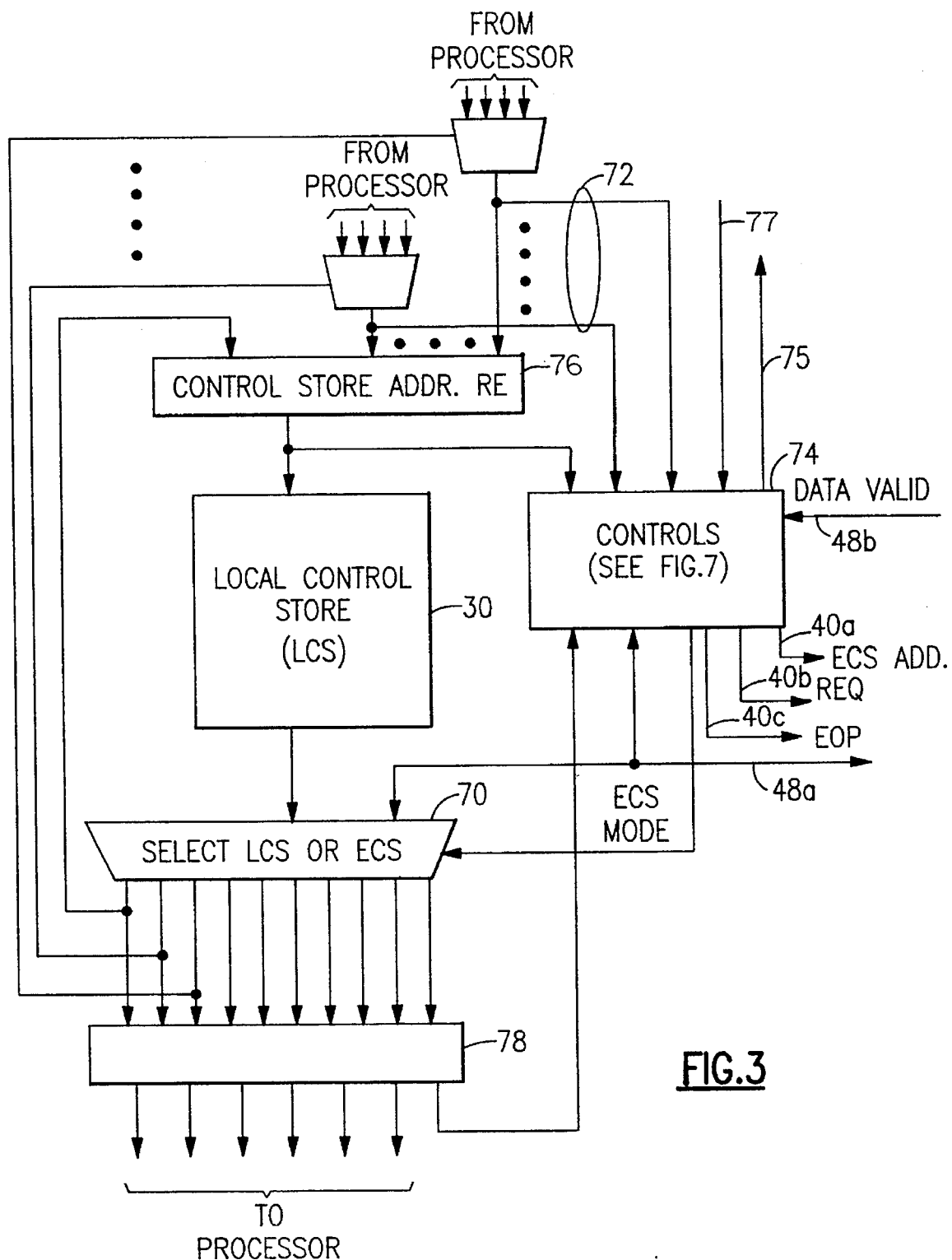
FIG. 3 is a block diagram of one of the microprocessor chips shown in FIG. 1.

Referring now to FIG. 3, the microcode 62a in the control store word 62 from the shared control store 34 is fed via bus 48a into a selection circuit 70 on one of the identical microprocessor chips 18 to 24 (here chip 22) along with the output of the local control store 30 on microprocessor chip 22. Selection between those two addresses is made by the extended control store mode signal provided by controls 74 for accessing the shared control store 34. To generate the ECS mode signal, the controls 74 include an address range compare circuit. The address range compare circuit in control circuit 74 determines whether the actual control store address is in the range of addresses of the local control store 30. If it is, the extended control store mode signal, or is down and the control store word from the local control store is selected, passed to the register 78 and acted on by the processor 14. If it is not within the range of addresses of the local store, the ECS mode signal is up and the microcode from the Extended Control Store is selected.

The controls 74 also compare the low order predicted address portion 62c of the selected control store word with the low order address bits 72 actually requested by the processor 10 using branch control signals to generate those actual low order bits for the actual address.

If the actual low order address bits 72 match the predicted low order bits in address field 62c, the predicted control store word is placed into the data register 78 to be provided to the processor 14. If the actual low order address bits do not match the address on the line 48a, a block execution signal 75 is sent to the processor 14 and the actual address is used to fetch the next control store word.

When any processor actions involving the extended store are complete, the controls 74 provide an end of operations signal (EOP) on line 40c to the shared control store 34. When the microprocessor requests access to the shared control store segment (including a request when there is a mismatch between the actual and predicted address) it sends a signal (REQ) on line 40b along with the requested address on bus 40a. The effect of these end of operation and request signals will be discussed in connection with FIG. 6. The controls 74 are discussed in more detail in connection with FIG. 7.

Figure 5:
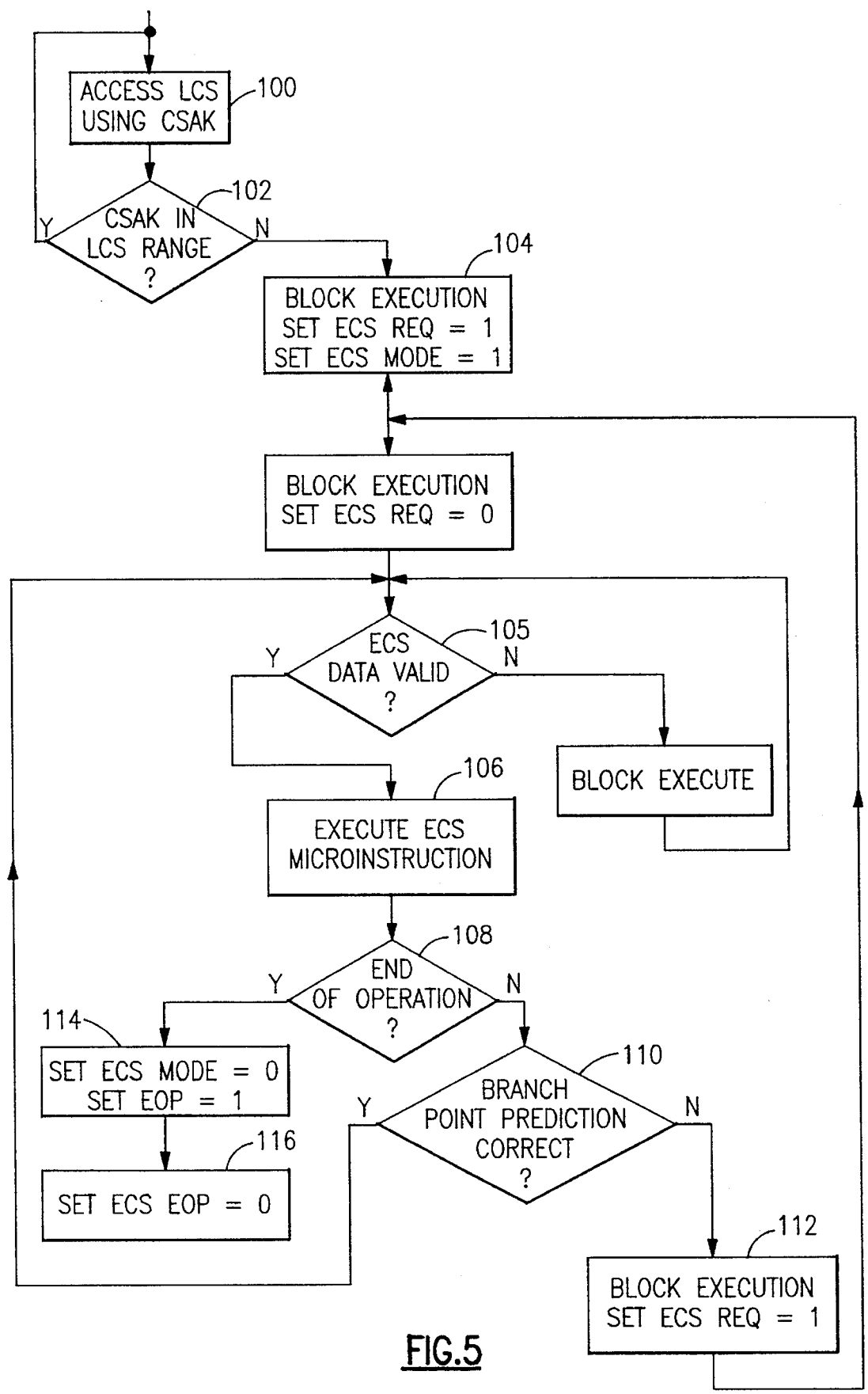
FIG. 5 is a flow diagram showing execution of a control store word in accordance with the present invention.

Referring now to FIG. 5, the processor accesses 100 the local control store by placing a requested address in the control store register. A comparison 102 is made by the address range compare circuit in the controls 74 to determine if the requested address is within the address range of the local control store and if it is the address is executed 100. If it is not within the address range of the local store, execution by the processor is blocked and a request 104 is sent to access the shared extended control store 34. If the microinstruction from the extended store 34 is determined to be valid 105 it is executed 106 and thereafter as long as there is no End Op signal 108 and the comparison 110 indicates the actual and predicted addresses match, the operation of the extended control store continues executing the predicted addresses. However, when an address prediction is incorrect, execution is blocked 112 and a new address request has to be provided by the processor. If there is an End Op signal 108 then the processor ceases using extended control store data and signals ECS End Op 114, resetting the ECS End Op signal one cycle later 116.

Figure 6A:
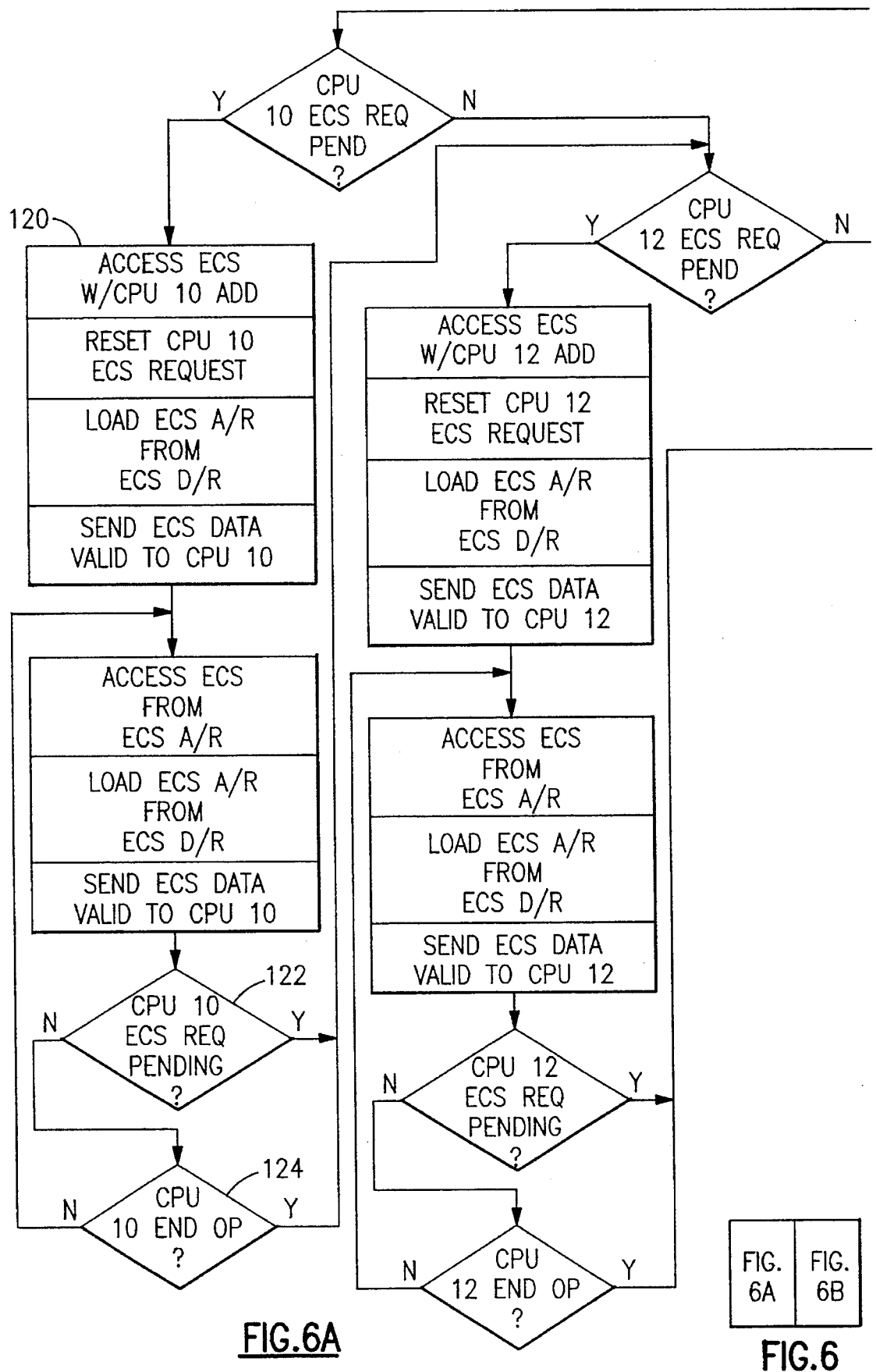
FIG. 6 is a flow diagram made up of FIGS. 6A to 6D showing operation of the priority system used in accessing the shared control store.
Figure 6:
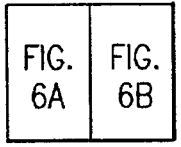
Figure 6B:
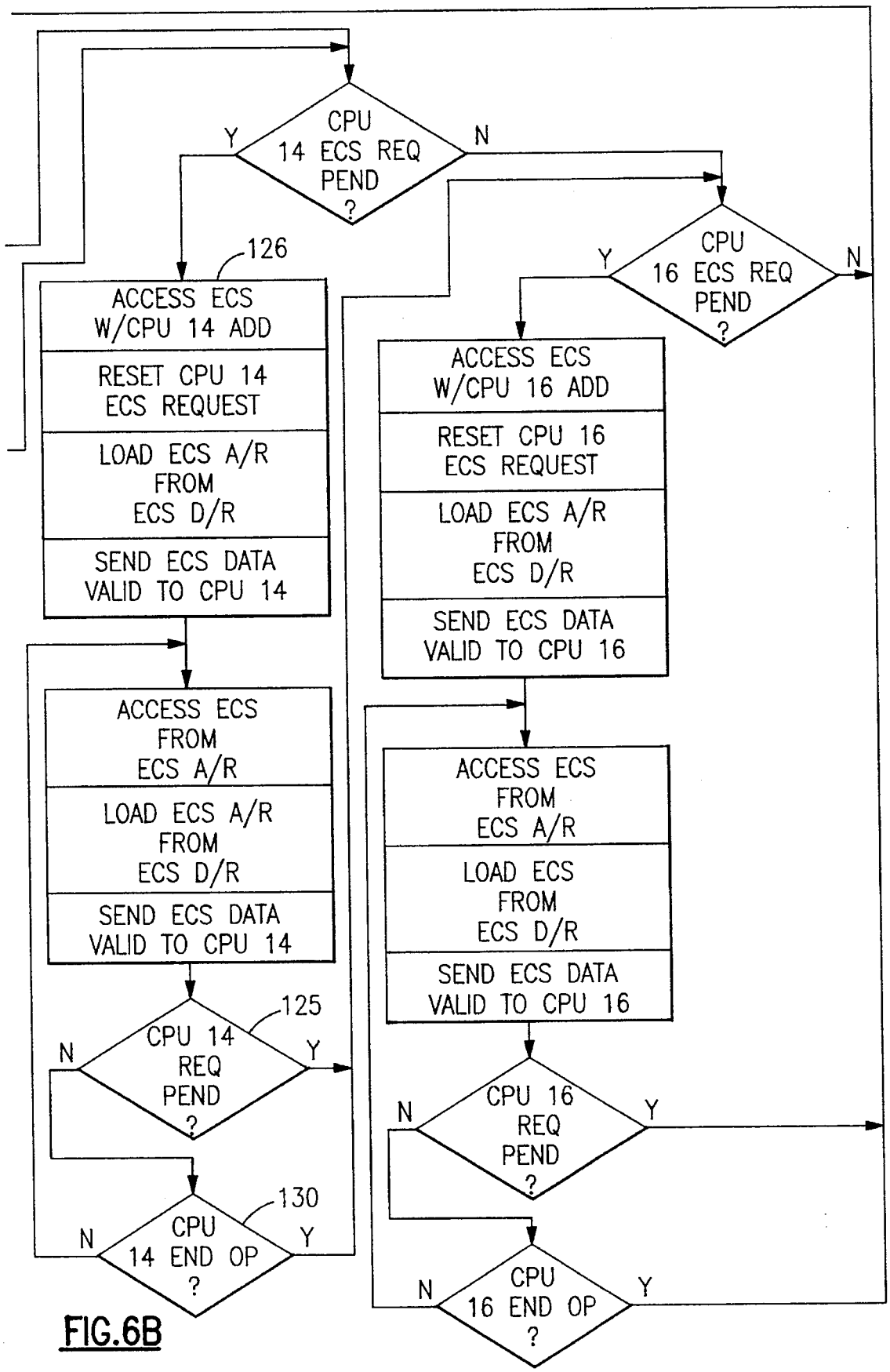

As shown in FIG. 6, the microprocessors are arranged in a priority sequence from microprocessor 10 to microprocessor 16. Once microprocessor 10 receives the access 120 to the extended store 34 it retains it as long as it does not issue a new request pending signal 122 (when a mismatch in the predicted and actual address occurs) or an end of operation signal 124 (it no longer wishes to access the shared segment of control store). When it issues either signal access to the extended store 34 is passed 126 to the next processor with a request pending (processor 14 in this example). Similarly, as long as processor 14 does not issue a new request to access the extended store 128 or end of operation signal 130 it will retain control of the extended control store. In this manner access is passed from processor to processor, starting with processor 10 proceeding in numerical sequence through processor 16 and eventually back to processor 10.

Figure 7:
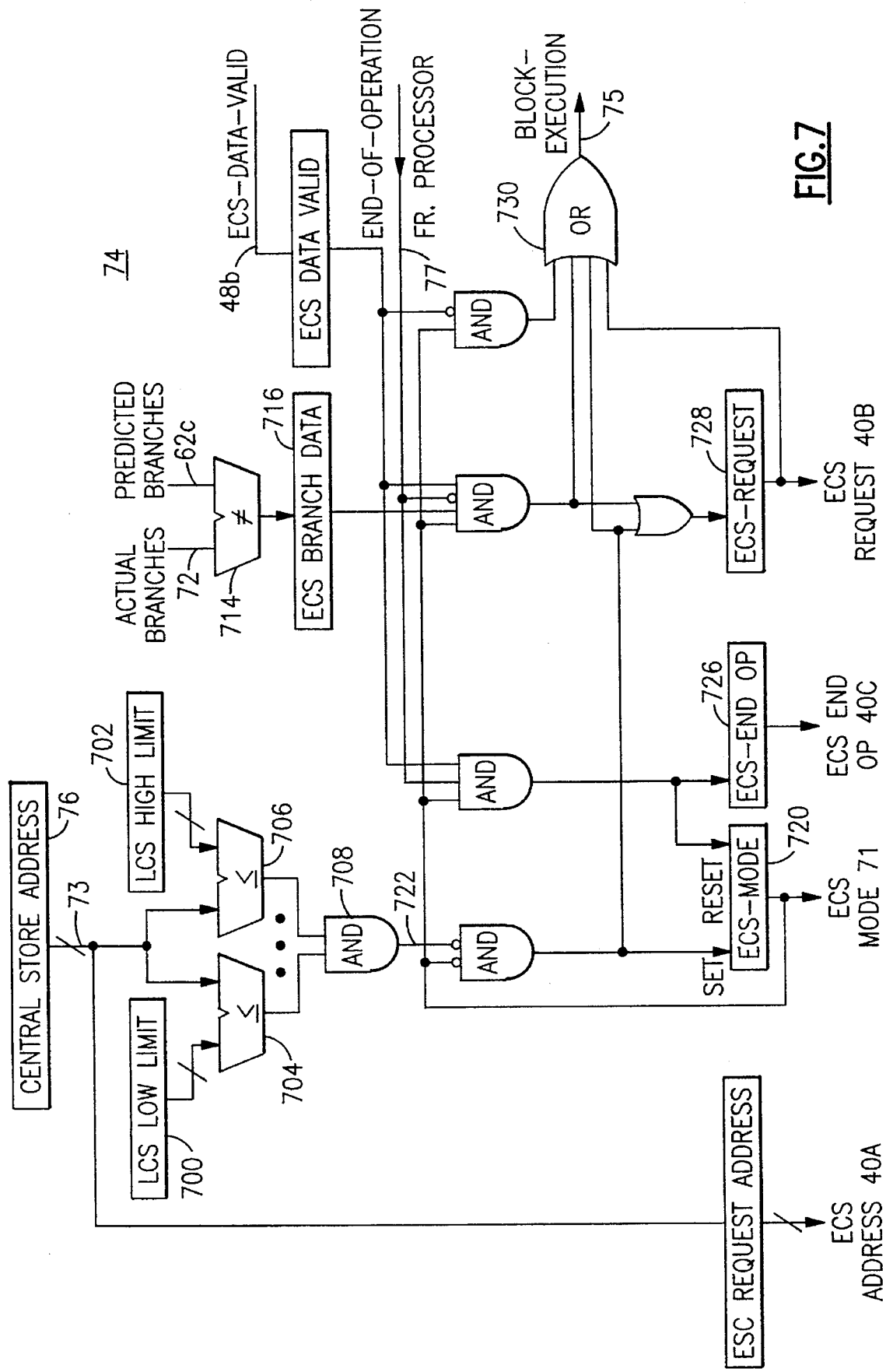
FIG. 7 is a block diagram showing the controls of FIG. 3 in more detail.

The controls 74 of FIG. 3 are shown in greater detail in FIG. 7. The control store address 62 from the control store address register 76 is compared to the lower and upper limits of the address range of the local control store stored in latches 700 and 702 respectfully. One comparator 704 determines whether the lower limit 700 is less than or equal to control store address 62, and a second comparator 706 determines whether the control store address 62 is less than or equal to the upper limit 702. The outputs of comparators 704 and 706 are combined in AND circuit 708 to determine whether control store address 62 lies in the range specified by limits 700 and 702. An alternative scheme is to set lower limit 700 equal to zero and upper limit equal to ((2**n)+1), in which case the entire range check is a logical OR of the control store address excluding the lower order (n) bits. Other forms of this comparison are possible, and are well known to those skilled in the art.

The predicted branch address bits 62c from the control store word 62 currently being executed are compared in comparison circuit 714 to the actual branch address bits 72 generated by the processor during the current cycle of execution. The output of comparison 714 is a 1 if any of the corresponding bits in 62c and address bits 72 are not equal. This output is staged for one cycle in latch circuit ECS Branch Data 716.

The Data Valid signal 48b from the Extended Control Store is latched for one cycle in ECS Data Valid latch 718.

ECS Mode Latch 720 indicates whether the processor is currently executing from the extended control store 34 or local control store 72. This latch is Set to "1" to indicate execution from the extended store when the range comparator output 722 is zero (indicating that the control store address is not within the range for local control store) and the current value of ECS Mode latch 720 is zero. ECS Mode latch 720 is Reset to "0" to indicate operation from the local store when the current value of that latch is one and the value of ECS data valid latch 718 is one and the End-of-Operation signal 77 from the execution controls is one.

When ECS mode latch 720 is one and ECS data valid latch 718 is one and End-of-Operation signal 77 is one, ECS Endop latch 726 is set to "1" for the next cycle. The output of ECS Endop latch 726 provides the ECS End Op signal 40c to the Extended Control Store 34.

ECS Request latch 728 indicates that a new address must be sent to the extended control store. This occurs when first entering ECS mode, or when a branch address is incorrectly predicted while in ECS mode. Specifically, ECS request latch 728 is set to one for one cycle if: ECS mode latch 720 is zero and range comparator output 722 is zero; or if ECS mode latch 720 is one and ECS branch wrong latch 716 is one and ECS data valid latch 718 is one and End-of-Operation signal 77 from the processor is zero. The output of ECS Request latch 728 drives the ECS request signal 36b to the Extended Control Store.

Block execution signal 75 is generated by OR circuit 730 which produces a one if ECS Request latch 728 is one or if ECS Request latch 728 is being set to one on this cycle, or if ECS Mode latch 720 is one and ECS Data Valid latch 718 is zero.

Figure 8B:
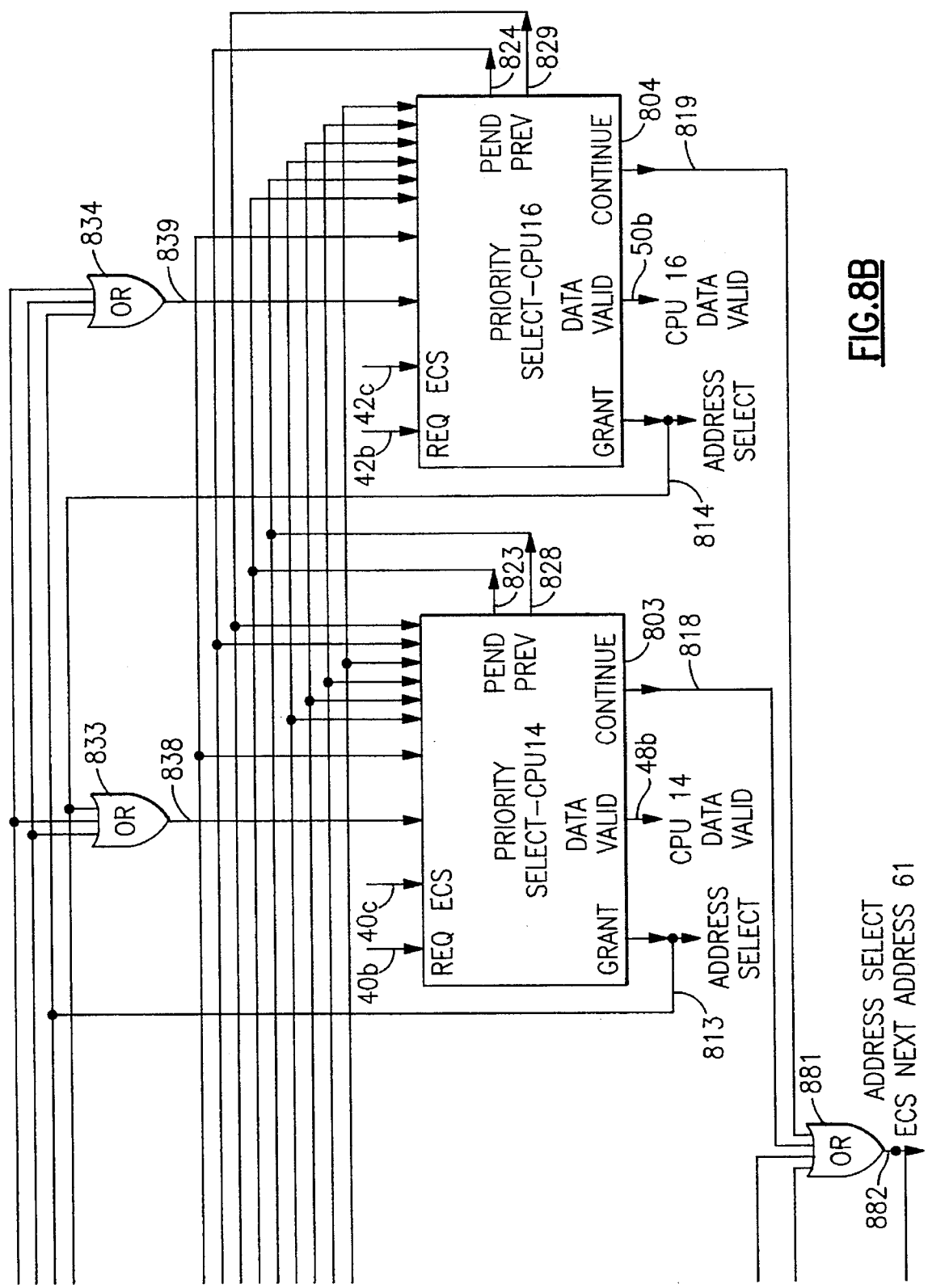
FIG. 8 us a block diagram made up of FIGS. 8A and 8B showing the controls in FIG. 2 in more detail.

The control logic circuitry 64 of FIG. 2 is shown in greater detail in FIG. 8. Identical, symmetrically connected Priority Select logic circuits 801 to 804 are used to determine which Central Processor 10 to 16 attached to the ECS 34 will be granted priority, and when priority will be granted. The CPU10 Priority Select logic 801 produces a CPU10 Priority Grant signal 811, the CPU10 ECS Data Valid signal 44b, a CPU10 ECS Continue signal 816, a CPU10 Request Pending signal 821, and a CPU10 Previous Priority signal 826. Similarly, the CPU12 Priority Select logic 802 produces CPU12 Priority Grant 812, CPU12 ECS Data Valid 46b, CPU12 ECS Continue 817, CPU12 Request Pending 822, and CPU12 Previous Priority 827 signals. The CPU14 Priority Select logic 803 and CPU16 Priority Select logic 804 produce the corresponding signals 813, 814, 48b, 50b, 818, 819, 823, 824, 828, and 829 for those CPU's as shown. The ECS Data Valid signals 44b, 46b, 48b, and 50b are those shown in FIG. 2.

The ECS Continue signals 816, 817, 818 and 819 are combined by OR circuit 881 to form a Use ECS Next Address signal 882. This signal 882, along with the ECS Priority Grant signals 811, 812, 813 and 814 collectively form the ECS Address Select signal 61 as shown in FIG. 2. When signal 882 is a logical one, the ECS Predicted Next Address 59 is placed in the ECS Address Register 68. When signal 811 is a logical one, the CPU10 ECS Address 52 is placed in the ECS Address Register 68. Similarly, signal 812 selects CPU12 ECS Address 54, signal 813 selects CPU14 ECS Address 56, and signal 814 selects CPU16 ECS Address 58. The design of the control logic described is such that at most one of these signals is a logical one in any given cycle. If none of these signals is a logical one, then the ECS is not being used and it is irrelevant what value is placed in the ECS Address Register 68.

The Use ECS Next Address signal 882 is logically inverted to form the Allow New Priority signal 883. The CPU12 ECS Priority Grant 812, CPU14 ECS Priority Grant 813, and CPU16 ECS Priority Grant 814 signals are combined by OR circuit 831 to form the CPU10 Reset Previous signal 836. Similarly, OR circuit 832 combines signals 811, 813, and 814 (the ECS Priority Grant signals for CPU10, CPU12 and CPU14) to form the CPU12 Reset Previous signal 837; OR circuit 833 combines signals 811, 812, and 814 to form the CP3 Reset Previous signal 838; and OR circuit 834 combines signals 811, 812, and 813 to form the CPU16 Reset Previous signal 839;

The inputs to the CPU10 Priority Select logic 801 are the CPU10 ECS Request signal 36b, the CPU10 ECS Endop signal 36c, the CPU10 Reset Previous signal 836, the Allow New Priority signal 883, the CPU16 Request Pending 824 and Previous Priority 829 signals, the CPU14 Request Pending 823 and Previous Priority 828 signals, and the CPU12 Request Pending 822 and Previous Priority 827 signals.

The inputs to the CPU12 Priority Select logic 802 are the CPU12 ECS Request signal 38b, the CPU12 ECS Endop signal 38c, the CPU12 Reset Previous signal 837, the Allow New Priority signal 883, the CPU10 Request Pending 821 and Previous Priority 826 signals, the CPU16 Request Pending 824 and Previous Priority 829 signals, and the CPU14 Request Pending 823 and Previous Priority 828 signals.

The inputs to the CPU14 Priority Select logic 803 are the CPU14 ECS Request signal 40b, the CPU14 ECS Endop signal 40C, the CPU14 Reset Previous signal 838, the Allow New Priority signal 883, the CPU12 Request Pending 822 and Previous Priority 827 signals, the CPU10 Request Pending 821 and Previous Priority 826 signals, and the CPU16 Request Pending 824 and Previous Priority 829 signals.

The inputs to the CPU16 Priority Select logic 804 are the CPU16 ECS Request signal 42b, the CPU16 ECS Endop signal 42c, the CPU16 Reset Previous signal 839, the Allow New Priority signal 883, the CPU14 Request Pending 823 and Previous Priority 828 signals, the CPU12 Request Pending 822 and Previous Priority 827 signals, and the CPU10 Request Pending 821 and Previous Priority 826 signals.

Figure 9:
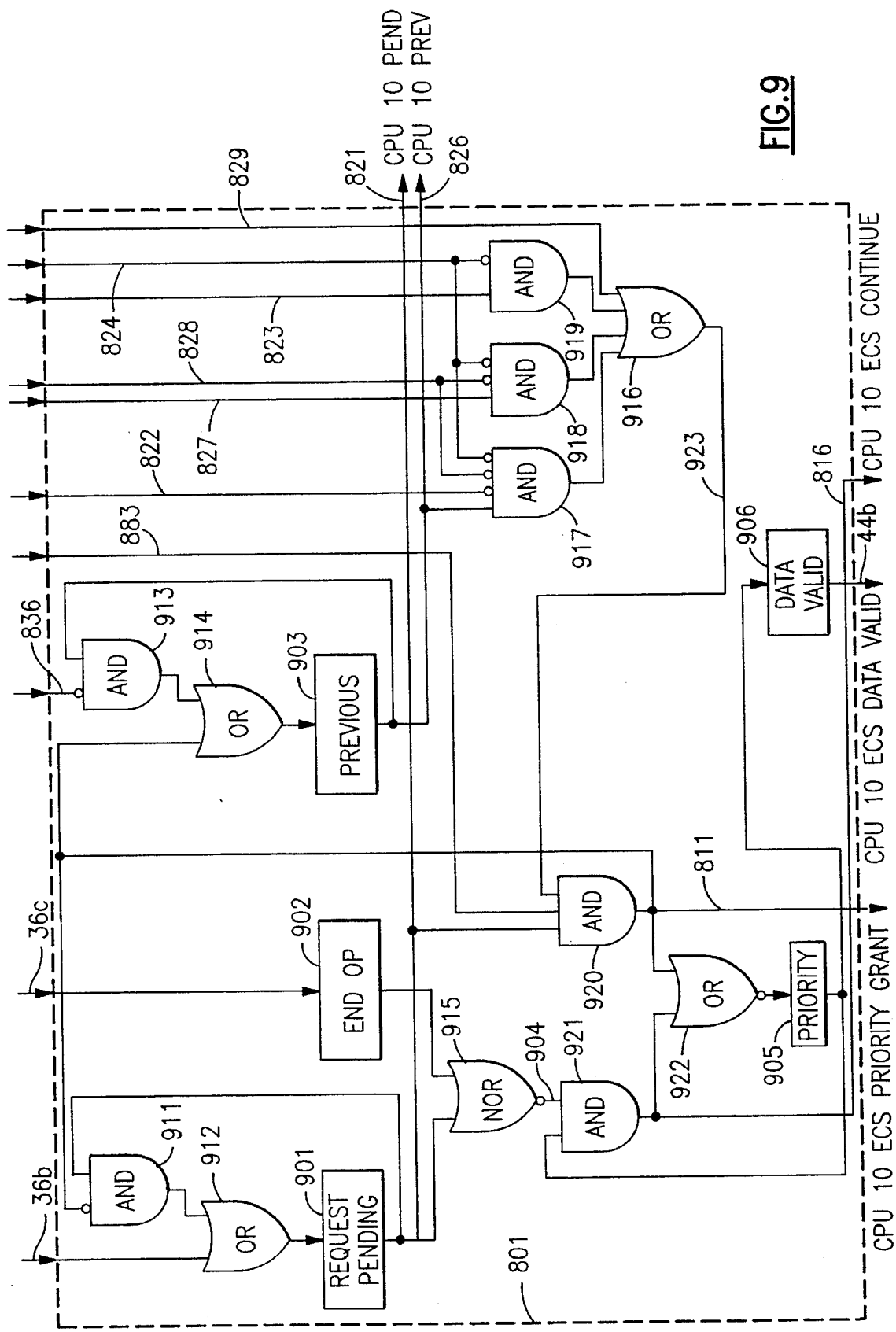
FIG. 9 is a block diagram showing the priority logic select circuit of FIG. 8 in more detail.

The CPU10 Priority Select logic 801 is shown in greater detail in FIG. 9. The Priority Select Logic for CPU12 802, CPU14 803, and CPU16 804 is identical, with the input connections arranged as shown in FIG. 8.

Latch circuit Request Pending 901 is set to a logic one by CPU10 ECS Request signal 36b, and holds that value until reset by CPU10 ECS Priority Grant signal 811, using AND circuit 911 and OR circuit 912.

Latch circuit Endop 902 is set by CPU10 ECS Endop signal 36c, and holds that value for one cycle only. Latch circuit previous 903 is set by CPU10 ECS Priority Grant signal 811, and holds that value until reset by CP1 Reset Previous signal 836, using AND circuit 913 and OR circuit 914.

Output signal CPU10 Request Pending 821 is the current value of latch Request Pending 901. Output signal CPU10 Previous Priority 826 is the current value of latch Previous 903.

The outputs of latches Request Pending 901 and Endop 902 are combined in NOR circuit 915 to form a Hold Priority signal 904.

A Next Priority signal 923 is formed by OR circuit 916, and AND circuits 917, 918, and 919 such that it is on if CPU16 previous priority 829 is on or if CPU14 Previous Priority 828 is on and CPU16 Request Pending 824 is off, and if CPU12 Previous Priority 827 is on and CPU14 Request Pending 823 is off and CPU16 Request Pending 824 is off, or if CPU10 Previous Priority 826 is on and CPU12 Request Pending 822 is off and CPU14 Request Pending 823 is off and CPU16 Request Pending 824 is off. Thus, this signal controls the round-robin sequencing of ECS priority among those CPU's requesting ECS access.

The output of latch Request Pending 901 is combined with the Allow ECS Priority signal 883 and the Next Priority signal 923 by AND circuit 920 to form the CPU10 ECS Priority Grant signal 811.

Latch circuit Priority 905 is set to a logical one by CPU10 ECS Priority Grant 811, and holds that value as long as Hold Priority signal 904 is on, using AND circuit 921 and OR circuit 922. The output of AND circuit 922 also forms the CPU10 ECS Continue signal 816.

Latch circuit Data Valid 906 is set by the output of latch circuit Priority 905 and holds that value for one cycle only. The output of latch Data Valid 906 forms the CPU10 ECS Data Valid signal 44b.

One embodiment of the invention has been described. However it should be readily apparent to one skilled in the art that modifications and variations can be made in this embodiment without departing from the spirit and scope of the invention. Therefore, it is not intended that the present invention be limited to the specifics of the foregoing description of the preferred embodiment.

What is claimed is:

1. A multiprocessor system comprising:

a) a plurality of microprocessors responsive to microcode contained in control store words;

b) a plurality of local control store means each coupled to a single microprocessor in said plurality of microprocessors for providing microcode, contained in certain of said control store words, to that single microprocessor in response to being accessed by addresses that fall within a specified range of addresses;

c) a shared control store means coupled to all microprocessors of said plurality of microprocessors for providing microcode, contained in other of said control store words, to any microprocessor in said plurality of microprocessors in response to being accessed by addresses that fall outside said specified range of addresses;

d) an address prediction field in said control store words provided by both the shared control store means and the plurality of local control store means, said address prediction field containing an address of another of said control store words;

e) comparison means for providing either a match or a no match indication between the address in the address prediction field in one of said control store words accessed by one of the microprocessors in the plurality of microprocessors and a next control store word address requested by said one of the microprocessors; and f) means responsive to a match indication by said comparison means to provide microcode in the another of said control store words at the address in the address prediction field of said one of said control store words to said one of the microprocessors.

2. The multiprocessor system of claim 1 wherein:

a) each of said control store words called for in claim 1 includes:

i. a microcode field containing a microcode word provided to a requesting microprocessor in said plurality of microprocessors, ii. a high order address field containing high order address bits of a next microcode word to be provided to said requesting microprocessor, iii. a branch field containing branch bits used to generate low order address bits of said next control store word, and p2 iv. a predicted low order address bit field containing a prediction of low order address bits that will be generated using the branch bits in said branch field; and b) said address prediction field comprises the high order address field together with the predicted low order address field.

3. The multiprocessor system of claim 2 including:

an address request generation means responsive to a no match indication from the comparison means to generate an address request signal.

4. The multiprocessor system of claim 3 including:

priority means for granting priority to access said shared control memory means to any microprocessor in the plurality of microprocessors then having priority over all other microprocessors in the plurality of microprocessors when said comparison means provides a match indication and for granting priority to another microprocessor in said plurality of microprocessors when said address request generation means generates an address request signal.

5. A multiprocessor system comprising:

a) a plurality of microprocessors:

b) a shared control store means for providing microcode contained in control store words stored in the shared control store means to any microprocessor in said plurality of microprocessors;

c) an address prediction field and a branch bit field in said control store words, each said address prediction field containing an address of another of said control store words;

d) a comparison means for comparing address bits in the address prediction field in one of said control store words accessed by one of the microprocessors of the plurality of microprocessors to bits in a next control store word address generated by said one of the microprocessors using branch bits in said branch bit field of said one of said control store words; and e) means responsive to a match indication by said comparator means to provide to said one of the microprocessors microcode in the another of said control store words at the address in the address prediction field of said one of said control store words.

6. The multiprocessor system of claim 5 including:

an address request generation means responsive to a no match indication by said comparison means to generate an address request signal.

7. The multiprocessor system of claim 6 including:

priority means for granting priority to access said shared control store to said one microprocessor having priority over all other microprocessors in the plurality of microprocessors when said comparison means provides a match indication and for granting priority to access said shared control store memory to another microprocessor in said plurality of microprocessors when said address request generation means generates an address request signal.

8. In a multiprocessor system where a plurality of processors each access a shared control store containing a series of control store words each with microcode for use in operation of the processors, a method of operation comprising:

a) storing in each control store word, in the series of control store words, a predicted address of another control store word in said series of control store words;

b) granting priority to access the shared control store to any processor then having access to the shared control store over other processors in the plurality of processors as long as addresses of control store words required from the shared control store by said any processor occur in a same order of occurrence as predicted addresses occur in control store words previously accessed by said any processor; and c) granting to another processor, in said plurality of processors, priority over said any processor when the predicted address of a control store word accessed by said any processor does not match an address of a control store word required next by said any processor.

9. The method of claim 8 including a step of returning priority to access the shared control store to said any processor only after pending requests for access to the shared control store by all of the other processors in the plurality of processors are granted.

10. A computer system comprising:

a) a processor;

b) a control store means providing microcode in control store words to said processor in response to being accessed by a control store word address provided by the processor;

c) a series of control store words stored in said control store means at a series of control store word addresses, each control store word containing:

i) a microcode field containing microcode to be provided to the processor;

ii) a high order address field containing high order address bits of a next control store word address in said series of control store word addresses to be requested by said processor;

iii) a branch field containing branch bits used to generate low order address bits of said next control store word address; and iv) a predicted low order address bit field containing predicted low order address bits of the next control store word address to be generated using the branch bits in the branch field;

d) means for combining the high order address bits with the predicted low order address bits in a first control store word in said series of control store words to obtain an address of a second control stored word;

e) comparator means for comparing the predicted low order address bits in the first control store word with the actual low order address bits of a control store word address in said series of a control store word addresses which is requested next by said processor; and f) means for providing the microcode in the second control store word to the processor when the comparator means indicates that the low order address bits in the predicted low order address field of the first control store word match said low order bits in the control store word address which is requested next by the processor.

11. A computer system comprising:

a) a processor;

b) a local control store means providing microcode in local control store words to said processor in response to being accessed by addresses that fall within e specified range of addresses;

c) en extended control store means which has a longer effective access time than the local control store means, said extended control store means providing microcode in extended control store words to the processor in response to being accessed by the processor with addresses which fall outside the specified address range of addresses responded to by the local control store means;

d) a predicted address field in each of said local and extended control store words containing a predicted address of a next control store word to be requested by the processor;

e) means for accessing said extended control store means with the predicted addresses in the extended control store words that have been requested by said processor to read extended control store words at the predicted addresses out of said extended control store means without the processor requesting those address from the extended control store means;

f) determination means for comparing the predicted address in each of the extended control store words that have been requested by said processor with a next actual address requested by processor and providing microcode in the extended control store words at the predicted addresses to the processor only when those predicted addresses each match the address of the next actual address requested by the processor; and g) means for the processor to access the extended control store means with any said next actual address not resulting in a match with a predicted address as set forth in paragraph f).

12. A computer system comprising:

a) a processor;

b) a control store;

c) a series of control store words stored in said control store at a series of control store addresses, each control store word containing:

i) a microcode field containing microcode to be provided to the processor;

ii) a high order address field containing high order address bits of a next control store word address in said series of control store word addresses to be requested by said processor;

iii) a branch field containing branch bits used to generate low order address bits of said next control store word address; and iv) a predicted low order address bit field containing predicted low order address bits of the next control store word address to be generated using the branch bits in the branch field;

d) means for combining the high order address bits with the predicted low order address bits in a first control store word in said series of control store words to obtain an address of a second control stored word;

e) a comparator coupled to the processor and control store for comparing the predicted low order address bits in the first control store word with actual low order address bits generated by said processor using the branch bits in the first control store word; and f) means for providing to the processor the microcode in the second control store word when the comparator indicates that the low order address bits in the predicted low order address field of the first control store word match the actual low order address bits generated by the processor.

13. A computer system comprising:

a) a processor;

b) a control store that contains microcode stored in control store words;

c) a predicted address field and a branch bit field in the control store words, each said predicted address field containing a predicted address of a control store word;

d) an accessing circuit coupled to said control store to access said control store with a predicted address in an accessed control store word requested by said processor to read another control store word at the predicted address out of said extended control store without the processor first requesting the predicted address from the control store; and e) means for comparing bits In the predicted address in the accessed control store word with bits in next actual address generated by the processor using branch bits in the branch bit field of the accessed control store word and providing microcode in the another control store word at the predicted address in the requested control store word to the processor only when the bits in the predicted address match the bits in the next actual address.

* * * * *